March 18, 1952     J. A. J. BENNETT     2,589,527
HELICOPTER ROTOR CONSTRUCTION
Filed Aug. 5, 1946     2 SHEETS—SHEET 1
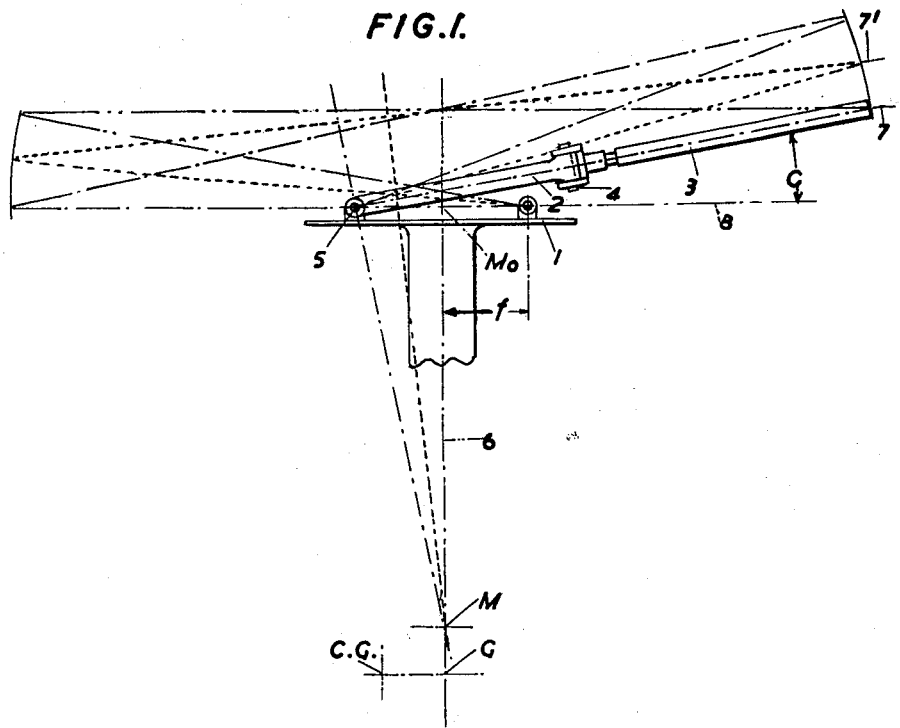
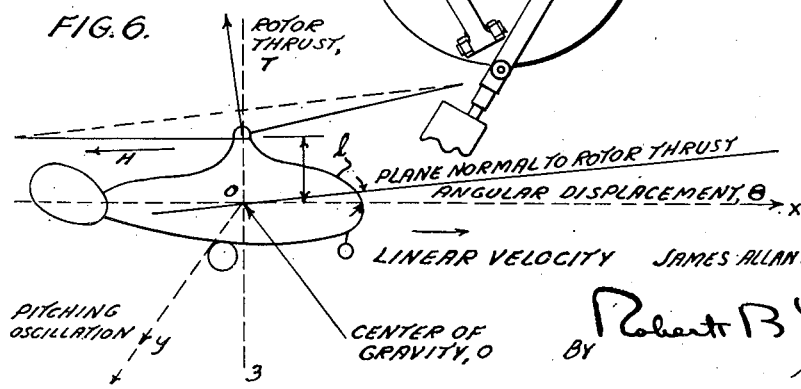
INVENTOR
JAMES ALLAN JAMIESON BENNETT
BY Robert B. _____
ATTORNEY March 18, 1952
J. A. J. BENNETT
2,589,527
HELICOPTER ROTOR CONSTRUCTION
Filed Aug. 5, 1946
2 SHEETS—SHEET 2
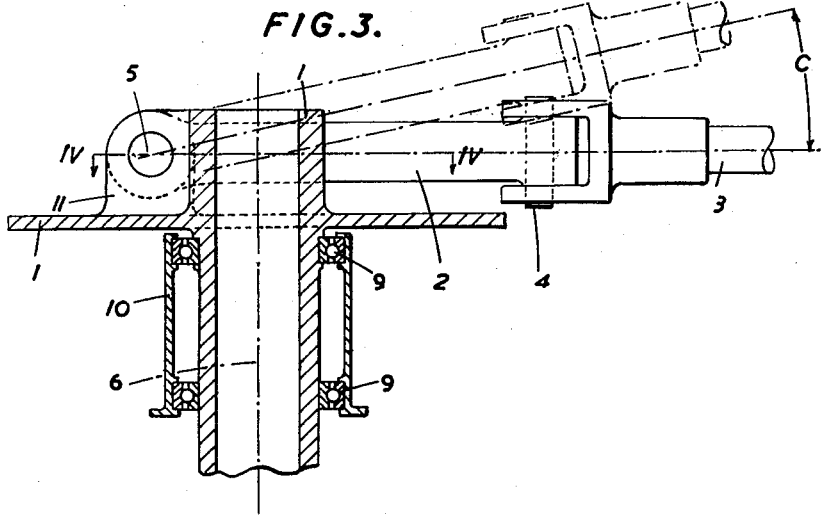
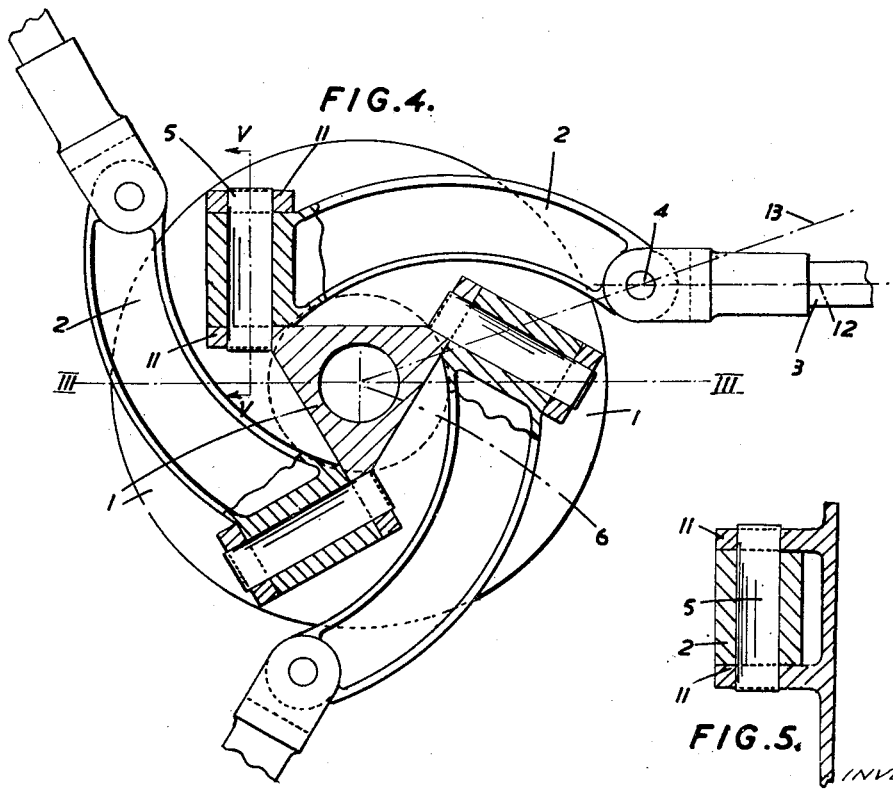
INVENTOR
JAMES ALLAN JAMIESON BENNETT,
BY Robert B Pearson
ATTORNEY

UNITED STATES PATENT OFFICE 2,589,527

HELICOPTER ROTOR CONSTRUCTION

James Allan Jamieson Bennett,
Dumbarton, Scotland

Application August 5, 1946, Serial No. 688,451
In Great Britain January 11, 1946

1 Claim. (Cl. 244—17.11)

The present invention relates to rotary-wing aircraft having one or more sustaining rotors, which may either be power-driven or autorotative in flight. The invention relates particularly to a helicopter in which each blade is mounted on a flapping pivot allowing the angle of the blade to its axis of rotation to be varied, the tip-path plane, therefore, being inclinable in flight with respect to the plane normal to the axis of the rotor hub.

An object of the invention is to provide an arrangement for eliminating or minimizing the unstable oscillation of the aircraft, especially in hovering flight, when it is displaced angularly, in pitch or in roll, by a gust. More particularly, an object of the invention is to improve the dynamic stability of a helicopter, when hovering, by displacing automatically the centre of pressure of the rotor thrust whenever the tip-path plane is displaced angularly with respect to the plane normal to the axis of the rotor hub, the moment of the rotor thrust resulting from the displacement of the centre of pressure being a stabilizing one, i. e. in the opposite sense to the moment of the rotor thrust resulting from the angular displacement of the tip path plane and, therefore, of the rotor thrust which is normal to this plane.

In a rotary wing aircraft according to the invention, particularly a helicopter, each blade is mounted on a flapping pivot located on the side of the rotor hub axis remote from the blade. An inclination of the tip-path plane with respect to the plane normal to the hub axis thereby displaces automatically the centre of pressure of the rotor thrust in the direction required for improving the dynamic stability of the helicopter.

The invention will be explained with reference to the accompanying drawing in which:

Figure 1 is a diagrammatic side elevation and Figure 2 is a diagrammatic plan.

Figure 3 is a sectional side elevation of one embodiment of the invention, taken on the line III—III, Figure 4, parts being omitted for the sake of clearness.

Figure 4 is a plan of the embodiment shown in Figure 3, parts being shown in section on the line IV—IV, Figure 3, and Figure 5 is a detail section on the line V—V, Figure 4.

Figure 6 is a diagrammatic side elevational view showing the relationship of the factors involved in the invention.

Referring now to Figures 1 and 2 of the drawings, 1 indicates the rotor head of a rotary-wing aircraft, 2 indicates a drag link, 3 a blade pivoted to the drag link 2 by means of a drag hinge 4, while 5 indicates the flapping hinge by which the drag link 2 is pivoted to the rotor head 1.

If the metacentre be defined as the point M, on the hub axis 6, through which the rotor thrust always passes when the tip-path plane 7 is inclined slightly as at 7' to the plane 7 normal to the hub axis 6, the location of the blade flapping pivots 5 in accordance with the present invention ensures that the metacentre M is below the plane containing the flapping pivots 5. Hitherto, rotary wing aircraft having rotor blades mounted on flapping pivots intersecting the hub axis, or located on the same side of the hub axis as the blade, have resulted in a metacentre in or above the plane containing the flapping pivots.

If the flapping pivot axis 5 be located at a distance $f$ from the rotor hub axis 6 on the side of this axis remote from the blade 3, and if the blades 3 have a coning angle C, the metacentre M is approximately at a distance $f$ cot $C$ below the plane 8 in which the flapping pivots 5 lie, i. e. below the position Mo of the metacentre when $f=0$. More particularly the metacentre can be defined as the point on the rotor axis located at a distance $f$ cot $C$ below the plane of the blade flapping pivots, where $f$ is the distance of each flapping pivot from the rotor axis and C is the blade coning angle in normal hovering.

C is usually a small angle, being approximately the angle of which the tangent is the ratio of lift to centrifugal force, or the value of the coning angle which prevails during normal hovering. The distance MMo (viz. $f$ cot $C$) will usually amount to several feet if $f$ be a few inches.

Hence, if G be the nearest point on the hub axis 6 to the centre of gravity C. G. of the aircraft, the metacentre height GM may be decreased from GMo to zero by increasing $f$ from zero to the value (GMo) tan $C$, in which case the static stability of the air craft would be reduced substantially to zero. This would be undesirable and therefore the distance $f$ is preferably chosen so that $f$ cot $C$ is less than GMo. In other words, the improvement in dynamic stability obtained by increasing $f$ is accompanied by a reduction in static stability and there are therefore lower and upper limits within which $f$ should preferably be chosen. It can be shown mathematically that these limits are given by the inequality $$\frac{1}{1+\frac{h^2}{k^2}} < \frac{f}{h \tan C} < 1$$

where $h=GMo$ and $k$ is the radius of gyration of the aircraft about the axis of pitch or roll.

Considering a rotary wing aircraft as shown in Fig. 6, axes $Ox$, $Oy$, $Oz$ are taken forward, sideways, and downwards, respectively, through the centre of gravity. The aircraft is considered to be hovering in equilibrium, with the rotor providing a thrust equal to the weight $Mg$ of the aircraft. Then suppose that the aircraft is subjected to a small disturbance, causing the aircraft to acquire velocities $x$ and $z$ horizontally and vertically, respectively, and an angular displacement in pitch of $\theta$.

For equilibrium of the forces at O in the $Ox$ and $Oz$ directions and of longitudinal moments about the $Oy$ axis, the equations governing the disturbance are:

$$\left. \begin{array}{l} M\ddot{x} = -T\theta - H + T\phi \\ B\ddot{\theta} = Hl_1 - Tl_1\phi \end{array} \right\}$$

where

T = rotor thrust
H = backward force on rotor normal to T
M = mass of aircraft
B = moment of inertia of the aircraft about the $y$ axis
$l_1$ = distance from centre of gravity to the rotor head
$\phi = a_0\theta$, and
$0 < a_0 < 1$ $\theta$ is here treated as a small quantity, and, as T is of the order of $Mg$, and H is a small quantity of the first order proportional to the disturbance velocity of the rotor head $(\dot{x} - l_1\dot{\theta})$, the term $H\theta$ has been neglected, and only first order terms retained.

If the oscillation of the tip-path plane is reduced in amplitude by $a_0$ times the oscillation of the body, $a_0$ being less than 1, the angle $\phi$ denotes the reduction in angle of oscillation of the tip-path plane when the amplitude of oscillation of the body is denoted by the Greek letter $\theta$.

Since the longitudinal force on a rotor is proportional to the velocity, we may write $$H = \frac{ho}{\psi R}(\dot{x} - l_1\dot{\theta})$$

where $\psi R$ = tip speed and
R = rotor radius.

$$\therefore M\ddot{x} = -Mg\theta + Mg\phi - \frac{bo}{\psi R}\dot{x} + \frac{hol_1}{\psi R}\dot{\theta}$$

and $$\frac{B}{l_1}\ddot{\theta} = -Mg\phi + \frac{ho}{\psi R}\dot{x} - \frac{hol_1}{\psi R}\dot{\theta}$$

adding, $$M\ddot{x} + \left(\frac{B}{l_1}\ddot{\theta} + Mg\theta\right) = 0$$

and $$\frac{ho}{\psi R}\dot{x} - \left(\frac{B}{l_1}\ddot{\theta} + \frac{hol_1}{\psi R}\dot{\theta} + Mga_0\theta\right) = 0$$

The solution of these two simultaneous equations is obtained by assuming $\dot{x} = A_1 e^{wt}$ and $\theta = A_2 e^{wt}$, giving two homogeneous linear equations in $A_1$ and $A_2$, as follows:

$$MwA_1 + \left(\frac{B}{l_1}w^2 + Mg\right)A_2 = 0$$

$$\frac{ho}{\psi R}A_1 - \left(\frac{B}{l_1}w^2 + \frac{hol_1}{\psi R}w + Mga_0\right)A_2 = 0$$

Eliminating $A_1$ and $A_2$, we obtain the frequency equation for $w$:

$$Mw\left(\frac{B}{l_1}w^2 + \frac{hol_1}{\psi R}w + Mga_0\right) + \frac{ho}{\psi R}\left(\frac{B}{l_1}w^2 + Mg\right) = 0$$

i. e.

$$MBw^3 + \frac{ho}{\psi R}(B + Ml_1^2)w^2 + M^2ga_0l_1w + \frac{hol_1}{\psi R}Mg = 0$$

which is of the form $$Aw^3 + Bw^2 + Cw + D = 0$$

where $w$ is the frequency of the oscillation.

The condition for stability is that the roots of the frequency equation should be real and negative, or imaginary with their real parts negative, and Routh has shown in his textbook "Advanced Rigid Dynamics" (1892) that this condition is satisfied provided the coefficients A, B, C and D are positive and, in addition, $BC > AD$.

Therefore, for stability, $$\frac{ho}{\psi R}(B + Ml_1^2)M^2ga_0l_1 > MB\frac{hol_1}{\psi R}Mg$$

i.e., $$Ml_1^2 a_0 > B(1 - a_0)$$

i.e., $$\frac{a_0}{1 - a_0} > \left(\frac{k_1}{l_1}\right)^2$$

where $k_1$ is the radius of gyration of the aircraft. Therefore $$a_0 > \frac{1}{1 + \frac{l_1^2}{k_1^2}}$$

Similarly the same inequality can be shown to apply for stability about the axis of roll.

In the embodiment of the invention illustrated by Figures 3, 4 and 5 the rotor head 1 is mounted in ball bearings 9 in a fixed hub 10, the upper part of the rotor head 1 being substantially triangular in plan, as shown in Figure 4, and carrying pairs of lugs 11, 11 between which drag links 2 are pivoted on the flapping hinge axes 5. The blades 3 are pivoted to the opposite ends of the drag links 2 on drag hinges 4 and each flapping hinge 5 is situated on that side of the rotor hub axis 6 remote from the corresponding blade 3.

In Figure 4 the positive torque position of a blade 3 is indicated at 12 and its zero torque position at 13.

I claim:

A helicopter comprising a bladed lift rotor wherein each blade is independently pivoted on a flapping pivot located on that side of the rotor hub axis remote from the major portion of the corresponding blade, each of said pivots having only a single pivot axis, and wherein the distance of each pivot axis from the rotor hub axis lies within the limits expressed by the inequality $$\frac{1}{1 + \frac{h^2}{k^2}} < \frac{f}{h \tan C} < 1$$

where $f$ is the distance between each pivot axis and the rotor hub axis, $h$ is the height of the pivot axes above the centre of gravity of the aircraft, $k$ is the radius of gyration of the aircraft about one of the principal horizontal axes of the aircraft, and C is the coning angle of the blades when the aircraft is in normal hovering condition.

JAMES ALLAN JAMIESON BENNETT.

REFERENCES CITED

The following references are of record in the file of this patent:

UNITED STATES PATENTS

| Number | Name | Date |
|---|---|---|
| 2,133,043 | Rothenhoefer | Oct. 11, 1938 |